United States Patent Office 3,249,577
Patented May 3, 1966

3,249,577
ELASTOMERIC POLYURETHANES DERIVED FROM POLYETHERS OR POLYESTERS, DIISOCYANATES AND DIAMINOOXAMIDES
Andre Rio and Jean Andre Robin, Lyon, Rhone, France, assignors to Rhone-Poulenc S.A., Paris, France, a French body corporate
No Drawing. Filed July 26, 1963, Ser. No. 297,939
Claims priority, application France, Aug. 1, 1962, 905,787
10 Claims. (Cl. 260—32.6)

This invention relates to elastomeric polymers derived from linear polyesters of polyethers of low molecular weight.

The elastomeric polyurethanes of the invention consist substantially completely of units of the formula:

—CO—NH—T—NH—COO—Z—OCO
—NH—T—NH—CO—NH—R—NH
—CO—CO—NH—R—NH— (I)

where T is a divalent aliphatic, cycloaliphatic or aromatic radical, R is a divalent aliphatic, cycloaliphatic or aromatic radical, and Z is a polyester or polyether residue such that the compound HO—Z—OH is a linear, hydroxy-terminated polyester or polyether of molecular weight 500 to 2500.

These new polyurethanes may be used in the preparation of flexible and elastic filaments and films having good stability to light and heat.

They are prepared in accordance with the invention, by first reacting a polyester or polyether of formula HO—Z—OH with at least two molecular proportions of a diisocyanate of formula: OCN—T—NCO, and then reacting the isocyanate-terminated polymer thus obtained with one molecular proportion of a diaminooxamide of formula:

H₂N—R—NH—CO—CO—NH—R—NH₂

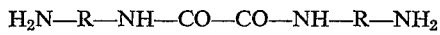

The isocyanate-terminated polymer obtained at the end of the first reaction has the formula:

O=C=N—T—NH—COO—Z
—OCO—NH—T—N=C=O (II)

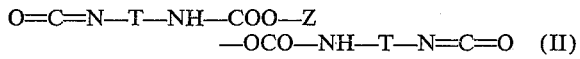

In the second reaction, this isocyanate-terminated polymer links with the diaminooxamides with the formation of urea functions to give the polyurethanes of the invention.

The polyesters employed in the preparation of the new polymers are linear, hydroxy-terminated condensation products, having a molecular weight of 500 to 2500, especially 1200 to 2000, of aliphatic and/or cyclic diacids with aliphatic and/or cyclic diols. They have a substantially zero acid number to avoid the formation of secondary products which might result from the action of free acid groupings on the diisocyanates and diamines with which they are reacted. Such polyesters are, for example, the products of condensation of aliphatic dicarboxylic acids of formula HOOC(CH₂)ₙCOOH where n is 2 to 8, e.g., adipic acid, or of terephthalic acids with an alkylene glycol of 2 to 4 carbon atoms, e.g., ethylene or propylene glycol or both. Instead of such polyesters, there may, for example, be used polyethers, consisting of units of formula —CₘH₂ₘO— where m is 2 to 4 linked together into a chain terminated by hydroxyl groups, especially polytetramethylene glycol, resulting from the polymerization or co-polymerization of olefine oxides, such as ethylene or propylene oxides, or of tetrahydrofuran. These polyethers also have a molecular weight of 500 to 2500, preferably 500 to 1000.

The diisocyanates OCN—T—NCO which are reacted with the polyesters of polyethers are aliphatic, cycloaliphatic or aromatic diisocyanates and include especially such compounds in which T is phenylene, tolyene, alkylene of 2 to 10 carbon atoms or a group of formua:

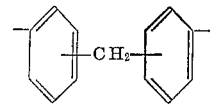

such as, for example, 1,6-diisocyanatohexane, the isomeric diisocyanatotoluenes, and p,p'-diisocyanatodiphenylmethane. They may comprise non-reactive functional groupings other than their isocyanate functions, such as in p,p'-diisocyanatotolyl urea.

The diaminooxamides used in making the polyurethanes of the invention are obtained by reacting an excess of primary aliphatic, cycloaliphatic or aromatic diamine with an aliphatic or aromatic diester of oxalic acid. These oxamides are crystallisable solids which are soluble in water and certain organic solvents such as dimethylformamide and dimethylsulphoxide. They are preferably obtained from alkylene diamines containing 2 to 6 carbon atoms, or from phenylene diamines. For example, there may be employed N,N'-bis(2-aminoethyl)oxamide, N,N'-bis(2-aminopropyl)oxamide or N,N'-bis(p-aminophenyl)oxamide, which are readily prepared by reacting ethylenediamine, 1,2-diaminopropane or p-phenylenediamine respectively with ethyl or phenyl oxalate.

The reaction of the diisocyanates with the starting polyethers or polyesters is readily effected by heating in an inert anhydrous non-volatile solvent which preferably has a sufficiently low boiling point to enable it to be eliminated at the end of the reaction by simple heating; chlorinated aliphatic hydrocarbons such as chloroform or dichloromethane are especially suitable. This elimination of the solvent, however, is not essential and the diaminooxamide in solution may be directly added to the reaction mass. Since the reaction of the isocyanate-terminated polymer with the diaminooxamide is rapid and generally exothermic, the reaction mass must be generally cooled to about 0° C. The latter reaction may also be carried out in a solvent for both the isocyanate-terminated polymer and the diaminooxamide, for example dimethylformamide. Polymer solutions are thus obtained which can be directly cast or spun by known methods, to give flexible, elastic filaments and films which have a high melting point and do not yellow under prolonged exposure to light.

The following examples describe the preparation of certain preferred polyurethanes of the invention.

*Example 1*

Into a 250-cc. spherical flask are introduced 29.4 g. of an ethyleneglycol/propyleneglycol adipate polyester (obtained using equal weights of the two glycols) having a molecular weight of about 1500 and a hydroxyl number of 77. There are then added 10 g. of p,p'-diisocyanatodiphenylmethane in solution in 70 ml. of dichloromethane, and the reaction mass is gradually heated to the boiling temperature of the solvent, which is eliminated in the course of the reaction. Heating is continued at about 85° C. for 1 hour after the complete disappearance of the solvent, and the product is then allowed to cool to ambient temperature and taken up with 100 ml. of dimethylformamide. Into the solution thus obtained, cooled to 0° C., is run a solution of 3.48 g. of N,N'-bis(2-aminoethyl)oxamide in 100 ml. of dimethylformamide. There is thus obtained a polyurethane solution which may be employed for the manufacture of elastic filaments and films. Films obtained, e.g. by casting, have a tensile strength of 273 kg./cm.², an elongation at break of 514%, and a modulus of elongation at 300% of 200 kg./cm.² (tests according to standard NF T 46,002).

*Example 2*

By proceeding as in Example 1, but replacing the p,p'-diisocyanatodiphenylmethane by 6.7 g. of 1,6-diisocyanatohexane, there is obtained a polymer which is soluble in dimethylformamide and from which there are obtained films having the following characteristics: tensile strength=341 kg./cm.²; elongation at break=825%; and modulus at elongation at 300%=151 kg./cm.². These films are very stable to light. When exposed for 70 hours to the ultra-violet rays from a mercury vapour lamp, they do not yellow.

If this test is repeated, replacing the N,N'-bis(2-aminoethyl)oxamide by 0.768 g. of hydrazine, when the running-in of the hydrazine solution is complete, the reaction mass sets to a thick gel, from which no polymer can be separated and which cannot be directly used in the preparation of films.

*Example 3*

By proceeding as in Example 1, but replacing N,N'-bis(2-aminoethyl)oxamide by 4.04 g. of N,N'-bis(2-aminopropyl)-oxamide, there is obtained a clear, spinnable polyurethane solution in dimethylformamide from which films are produced, which have a tensile strength of 380 kg./cm.² and an elongation at break of 670%.

*Example 4*

Proceeding as in Example 1, there are reacted with the same quantity of the same polyester, first 6.7 g. of 1,6-diisocyanatohexane and then 4.04 g. of N,N'-bis(2-aminopropyl)oxamide in solution in dimethylformamide. A polyurethane solution is obtained, from which can be obtained films which do not yellow after exposure to ultraviolet rays for 70 hours. These films have a tensile strength of 240 kg./cm.² and an elongation at break of 860%.

If the same test is repeated, replacing the N,N'-bis(2-aminopropyl)oxamide by an equivalent quantity of ethylenediamine, there is obtained at the end of the reaction of a gel which cannot be cast.

*Example 5*

By reacting 30 g. of the ethyleneglycol/propyleneglycol polyadipate of Example 1, first with 10 g. of p,p'-diisocyanatodiphenylmethane and then with 5.72 g. of N,N'-bis(6-aminohexyl)oxamide, under the conditions of Example 1, a polyurethane which can be cast into elastic films is obtained.

*Example 6*

With 20 g. of polytetramethyleneglycol, having a molecular weight of about 700, there are successively reacted, by the procedure of Example 1, 10 g. of p,p'-diisocyanatodiphenylmethane and 3.48 g. of N,N'-bis(2-aminoethyl)oxamide in solution in dimethylformamide. A clear, homogeneous polyurethane solution is thus obtained which can be directly employed for the production of flexible and elastic films and filaments.

We claim:

1. Elastomeric polyurethanes consisting substantially completely of units of the formula:

—CO—NH—T—NH—COO—Z
    —OCO—NH—T—NH—CO—NH
        —R—NH—CO—CO—NH—R—NH— linked together by bonds from terminal —CO— to terminal —NH— and having end radicals of formula

H₂N—R—HN—CO—CONH—R—NH— attached to —CO— and —H attached to —NH— where T is a divalent radical selected from the group consisting of divalent saturated unsubstituted aliphatic chains containing 2 to 10 carbon atoms, phenylene, tolylene, and groups of formula:

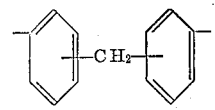

R is a divalent radical selected from the group consisting of saturated unsubstituted aliphatic chains containing 2 to 6 carbon atoms and phenylene, and Z is such that the compound HO—Z—OH has a molecular weight of 500 to 2500 and is either (i) a linear, hydroxy-terminated polyester derived from an aliphatic dicarboxylic acid of formula HOOC(CH₂)ₙCOOH where n is 2 to 8 or terephthalic acid and an alkylene glycol of 2 to 4 carbon atoms or (ii) a polyether consisting of units of formula C_mH_{2m}O where m is 2 to 4 linked into a chain terminated by hydroxyl groups.

2. Elastomeric polyurethanes as claimed in claim 1, in which T is hexamethylene.

3. Elastomeric polyurethanes as claimed in claim 1 in which Z is such that the compound HO—Z—OH is a linear, hydroxy-terminated polyester of molecular weight of 500 to 2500 formed by condensing an alkylene glycol of 2 to 4 carbon atoms with terephthalic acid.

4. Elastomeric polyurethanes as claimed in claim 1 in which T is

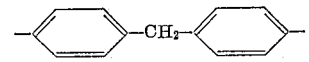

5. Elastomeric polyurethanes consisting substantially completely of units of the formula:

—CO—NH—T—NH—COO—Z
    —OCO—NH—T—NH—CO—NH
        —R—NH—CO—CO—NH—R—NH— linked together by bonds from terminal —CO— to terminal —NH— and having end radicals of formula

H₂N—R—HN—CO—CONH—R—NH— attached to —CO— and —H attached to —NH— where T is selected from the class consisting of hexamethylene and

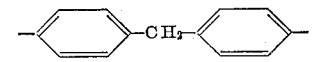

R is alkylene of 2 to 6 carbon atoms, and Z is such that the compound HO—Z—OH is a linear, hydroxy-terminated polyester of molecular weight 500 to 2500 formed by condensing adipic acid with an alkylene glycol of 2 to 3 carbon atoms.

6. Elastomeric polyurethanes consisting substantially completely of units of the formula:

—CO—NH—T—NH—COO—Z
    —OCO—NH—T—NH—CO—NH
        —R—NH—CO—CO—NH—R—NH— linked together by bonds from terminal —CO— to terminal —NH— and having end radicals of formula

H₂N—R—HN—CO—CONH—R—NH— attached to —CO— and —H attached to —NH— where T is selected from the class consisting of hexamethylene and

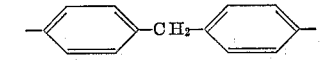

R is alkylene of 2 to 6 carbon atoms, and Z is such that the compound HO—Z—OH is a linear, hydroxy-terminated polytetramethylene glycol of molecular weight 500 to 2500.

7. Elastomeric polyurethanes consisting substantially completely of units of the formula:

—CO—NH—T—NH—COO—Z
    —OCO—NH—T—NH—CO—NH
        —R—NH—CO—CO—NH—R—NH— linked together by bonds from terminal —CO— to terminal —NH— and having end radicals of formula

H₂N—R—HN—CO—CONH—R—NH— attached to —CO— and —H attached to —NH— where T is selected from the class consisting of hexamethylene and

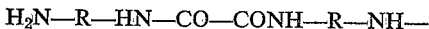

R is alkylene of 2 to 6 carbon atoms, and Z is such that the compound HO—Z—OH is a linear, hydroxy-terminated polyester of molecular weight 1200 to 2000 formed by condensing adipic acid with an alkylene glycol of 2 to 3 carbon atoms.

8. Elastomeric polyurethanes consisting substantially completely of units of the formula:

—CO—NH—T—NH—COO—Z
   —OCO—NH—T—NH—CO—NH
      —R—NH—CO—CO—NH—R—NH— linked together by bonds from terminal —CO— to terminal —NH— and having end radicals of formula

H₂N—R—HN—CO—CONH—R—NH— attached to —CO— and —H attached to —NH— where T is selected from the class consisting of hexamethylene and

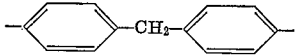

R is alkylene of 2 to 6 carbon atoms, and Z is such that the compound HO—Z—OH is a linear, hydroxy-terminated polytetramethylene glycol of molecular weight 500 to 1000.

9. Solutions of elastomeric polyurethanes consisting substantially completely of units of the formula:

—CO—NH—T—NH—COO—Z
   —OCO—NH—T—NH—CO—NH
      —R—NH—CO—CO—NH—R—NH— linked together by bonds from terminal —CO— to terminal —NH— and having end radicals of formula

H₂N—R—HN—CO—CONH—R—NH— attached to —CO— and —H attached to —NH— where T is a divalent radical selected from the group consisting of divalent saturated unsubstituted aliphatic chains containing 2 to 10 carbon atoms, phenylene, tolylene, and groups of formula:

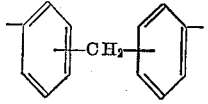

R is a divalent radical selected from the group consisting of saturated unsubstituted aliphatic chains containing 2 to 6 carbon atoms and phenylene, and Z is such that the compound HO—Z—OH has a molecular weight of 500 to 2500 and is either (i) a linear, hydroxy-terminated polyester derived from an aliphatic dicarboxylic acid of formula HOOC(CH₂)ₙCOOH where n is 2 to 8 or terephthalic acid and an alkylene glycol of 2 to 4 carbon atoms or (ii) a polyether consisting of units of formula CₘH₂ₘO where m is 2 to 4 linked into a chain terminated by hydroxyl groups.

10. Solutions in dimethylformamide of elastomeric polyurethanes consisting substantially completely of units of the formula:

—CO—NH—T—NH—COO—Z
   —OCO—NH—T—NH—CO—NH
      —R—NH—CO—CO—NH—R—NH— linked together by bonds from terminal —CO— to terminal —NH— and having end radicals of formula

H₂N—R—HN—CO—CONH—R—NH— attached to —CO— and —H attached to —NH— where T is a divalent radical selected from the group consisting of divalent saturated unsubstituted aliphatic chains containing 2 to 10 carbon atoms, phenylene, tolylene, and groups of formula:

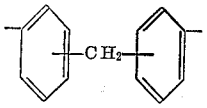

R is a divalent radical selected from the group consisting of saturated unsubstituted aliphatic chains containing 2 to 6 carbon atoms and phenylene, and Z is such that the compound HO—Z—OH has a molecular weight of 500 to 2500 and is either (i) a linear, hydroxy-terminated polyester derived from an aliphatic dicarboxylic acid of formula HOOC(CH₂)ₙCOOH where n is 2 to 8 or terephthalic acid and an alkylene glycol of 2 to 4 carbon atoms or (ii) a polyether consisting of units of formula CₘH₂ₘO where m is 2 to 4 linked into a chain terminated by hydroxyl groups.

References Cited by the Examiner

UNITED STATES PATENTS

| | | | |
|---|---|---|---|
| 2,983,702 | 5/1961 | Little et al. | 260—77.5 |
| 3,012,992 | 12/1961 | Pigott et al. | 260—75 |
| 3,043,807 | 7/1962 | Snyder et al. | 260—75 |
| 3,087,912 | 4/1963 | Wagner et al. | 260—77.5 |
| 3,105,062 | 9/1963 | Graham et al. | 260—75 |
| 3,114,734 | 12/1963 | Gorbran et al. | 260—75 |

MORRIS LIEBMAN, *Primary Examiner.*